United States Patent
Jung et al.

(10) Patent No.: US 10,160,851 B2
(45) Date of Patent: Dec. 25, 2018

(54) THERMOPLASTIC RESIN COMPOSITION AND MOLDED ARTICLE EMPLOYING SAME

(71) Applicant: LG CHEM, LTD., Seoul (KR)

(72) Inventors: Dae San Jung, Daejeon (KR); Seung Hun Han, Daejeon (KR); Seong Lyong Kim, Daejeon (KR); Hyun Ho Joo, Daejeon (KR); Ju Hyeong Lee, Daejeon (KR); Soo Kyeong Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/508,042

(22) PCT Filed: Nov. 26, 2015

(86) PCT No.: PCT/KR2015/012745
§ 371 (c)(1),
(2) Date: Mar. 1, 2017

(87) PCT Pub. No.: WO2016/089042
PCT Pub. Date: Jun. 9, 2016

(65) Prior Publication Data
US 2017/0292017 A1 Oct. 12, 2017

(30) Foreign Application Priority Data
Dec. 4, 2014 (KR) .................. 10-2014-0173373

(51) Int. Cl.
*C08L 35/00* (2006.01)
*C08L 25/12* (2006.01)
*C08L 55/02* (2006.01)
*C08L 25/08* (2006.01)
*C08L 25/16* (2006.01)
*C08L 35/06* (2006.01)

(52) U.S. Cl.
CPC .............. *C08L 25/12* (2013.01); *C08L 25/08* (2013.01); *C08L 25/16* (2013.01); *C08L 35/00* (2013.01); *C08L 35/06* (2013.01); *C08L 55/02* (2013.01); C08L 2201/08 (2013.01); C08L 2205/025 (2013.01); C08L 2205/03 (2013.01); C08L 2205/035 (2013.01); C08L 2207/04 (2013.01)

(58) Field of Classification Search
CPC ...... C08L 23/12; C08L 25/08; C08L 2207/04; C08L 2205/03; C08L 2205/035; C08L 2205/025; C08L 2201/08
See application file for complete search history.

(56) References Cited

U.S. PATENT DOCUMENTS

| | | | |
|---|---|---|---|
| 3,010,936 A | 11/1961 | Irvin | |
| 4,659,790 A | 4/1987 | Shimozato et al. | |
| 4,757,109 A | 7/1988 | Kishida et al. | |
| 4,972,032 A | 11/1990 | Henton et al. | |
| 5,674,940 A | 10/1997 | Eichenauer et al. | |
| 6,114,442 A * | 9/2000 | Jung | C08L 25/12 525/176 |
| 2005/0009970 A1 | 1/2005 | Seidel et al. | |
| 2007/0265393 A1 | 11/2007 | Sohn et al. | |
| 2008/0093578 A1* | 4/2008 | Park et al. | C08F 279/04 252/68 |
| 2009/0156719 A1 | 6/2009 | Jin et al. | |

FOREIGN PATENT DOCUMENTS

| | | |
|---|---|---|
| CN | 1331727 A | 1/2002 |
| CN | 101506300 A | 8/2009 |
| CN | 102108164 A | 6/2011 |
| CN | 103342874 A | 10/2013 |
| CN | 103342886 | 10/2013 |
| JP | 58-206657 A | 12/1983 |
| JP | 63-162708 A | 7/1988 |
| JP | 63-235350 A | 9/1988 |
| JP | 08295771 A | 11/1996 |
| JP | 10-036626 A | 2/1998 |
| JP | 11152387 A | 6/1999 |
| JP | 2001234023 A | 8/2001 |
| JP | 2001-279049 A | 10/2001 |
| JP | 2007302862 A | 11/2007 |
| KR | 10-1998-0073191 A | 11/1998 |
| KR | 10-0232625 B1 | 12/1999 |
| KR | 10-2001-0062876 A | 7/2001 |
| KR | 10-2001-0075652 A | 8/2001 |
| KR | 10-2003-0005981 A | 1/2003 |
| KR | 10-0385728 B1 | 5/2003 |
| KR | 10-2006-0028421 A | 3/2006 |

(Continued)

OTHER PUBLICATIONS

XP-002777968: Database WPI Week 201427, Thomson Scientific, London, GB; AN 2013-X08663. (related to CN 103342886A, published Oct. 9, 2013).
"EMI flow modifier gives ABS resin excellent performance", Shanghai Kumo Sunny Plastics Co., Ltd., Sep. 17, 2013 at http://www.kumhosunny.com/news/detail-283-28.html.

*Primary Examiner* — Nathan M Nutter
(74) *Attorney, Agent, or Firm* — Dentons US LLP

(57) ABSTRACT

The present invention relates to a styrene-based thermoplastic resin composition with improved flowability and, more specifically, a thermoplastic resin composition, which retains heat resistance and improved flowability by introducing a low-molecular weight styrene-acrylonitrile (SAN) resin into an acrylonitrile-butadiene-styrene (ABS) resin, which has enhanced heat resistance through the addition of a heat-resistant resin, and to a molded article into which the composition is molded. According to the resin composition, there can be obtained: a thermal resin composition, which has an improvement in the flowability of the heat-resistant ABS resin and retains non-deteriorating or favorable heat resistance and impact resistance; and a molded article.

10 Claims, No Drawings

(56) References Cited

FOREIGN PATENT DOCUMENTS

| KR | 10-0561339 B1 | 3/2006 |
| KR | 10-2011-0039706 A | 4/2011 |
| KR | 10-1035072 B1 | 5/2011 |
| KR | 10-2012-0016341 A | 2/2012 |
| KR | 10-2012-0029156 A | 3/2012 |
| KR | 10-2013-0062779 A | 6/2013 |
| WO | 00/024829 A1 | 5/2000 |

* cited by examiner

THERMOPLASTIC RESIN COMPOSITION AND MOLDED ARTICLE EMPLOYING SAME

This application is a National Stage Application of International Application No. PCT/KR2015/012745 filed on Nov. 26, 2015, which claims the benefit of Korean Patent Application No. 10-2014-0173373 filed on Dec. 4, 2014, all of which are hereby incorporated by reference in their entirety for all purposes as if fully set forth herein.

TECHNICAL FIELD

This application claims the benefit of priority based on Korean Patent Application No. 10-2014-0173373 filed on Dec. 4, 2014, the full disclosure of which is incorporated as a part of this specification.

The present invention relates to a styrene-based thermoplastic resin composition with improved flowability, more specifically, to a thermoplastic resin composition having improved flowability, while maintaining heat resistance, by introducing a low-molecular weight styrene-acrylonitrile (SAN) resin to an acrylonitrile-butadiene-styrene (ABS) resin to which a heat-resistant resin is added to reinforce the heat resistance, and a molded article by molding the same.

BACKGROUND ART

A styrene-based thermoplastic resin is a resin synthesized by homo-polymerizing styrene as a main raw material or co-polymerizing it with monomers to obtain advantages from the properties of each monomer. As the styrene-based resin, there are general purpose polystyrene (GPPS) resins and expendable polystyrene (EPS) resins obtained by homopolymerizing styrene, high-impact polystyrene (HIPS) resins being copolymers of styrene and butadiene rubber, and ABS resins obtained by grafting styrene and acrylonitrile to a butadiene rubber.

In addition, there are ASA resins obtained by co-polymerizing styrene and acrylonitrile with an acrylic rubber as a base, MBS-based impact-reinforcing agents obtained by co-polymerizing styrene and methyl methacrylate (MMA) with polybutadiene as a base, or acrylic-based impact-reinforcing agents obtained by co-polymerizing methyl methacrylate (MMA) and an acrylate monomer with an acrylic rubber as a base. Styrene has an advantage in processability, butadiene has an advantage in impact resistance, and acrylonitrile has advantages in rigidity and chemical resistance.

Styrene-based thermoplastic resin compositions are utilized in various applications. ABS resins represented by rubber-reinforced styrene-based resins are widely used in electric and electronic components, office appliances, automotive components, etc. due to their excellent mechanical properties, molding processability, and the like. In particular, since the temperature inside an automobile is raised due to heat generated in the engine and heat due to sunlight exposure from the outdoors, a heat-resistant ABS resin is generally used as the ABS resin used for automotive components.

General methods to render the ABS resin heat-resistant include a method of adding α-methylstyrene (AMS)-based or maleimide-based monomers, which have excellent heat resistance, in the ABS polymerization procedure, and a method of mixing the heat-resistant copolymer comprising the above monomers having excellent heat resistance with the ABS resin. However, such a heat-resistant ABS resin has lower fluidity compared to general-purpose ABS resins, and thus it has a limitation in manufacturing large parts or parts with complicated structure by injection. It also causes a problem of quality and deformation in the appearance of the molded article.

To solve the problem of flowability in such a heat-resistant ABS resin, a method for improving the flowability by using a phosphoric ester compound is known, but there is still the remaining problem wherein the heat resistance is significantly lowered in the resin composition using the phosphoric ester compound, and the so-called "juicing phenomenon" is caused, in which the phosphoric ester compound is volatilized during the molding to be deposited on the surface of the molded article.

DETAILED DESCRIPTION OF INVENTION

Technical Problem

An object of the present invention is to improve low flowability of a heat-resistant ABS resin in which α-methylstyrene (AMS)-based or maleimide-based heat-resistant resin is applied as a matrix.

Another object of the present invention is to prepare a heat-resistant ABS resin with improved flowability, while heat resistance is maintained or satisfied within a satisfactory range.

The other object of the present invention is to prepare the heat-resistant ABS resin with improved flowability, while impact resistance is not lowered or satisfactory, without causing additional problems in the finished product after molding.

Technical Solution

Accordingly, the present invention is contrived to solve the above problems, and is intended to complement flowability by adding a styrene-acrylonitrile (SAN)-based resin having a weight average molecular weight (Mw) of 10,000 to 70,000 to the ABS resin, wherein at least one of both alpha-methylstyrene (AMS)-based heat-resistant resin and N-phenylmaleimide (PMI)-based resin is added to reinforce the heat resistance, within the range of 0.5 to 10 parts by weight relative to the total weight of the entire heat-resistant ABS resin.

Effects of Invention

According to the thermoplastic resin composition of the present invention, it is possible to improve the flowability without deteriorating the heat resistance and impact strength. That is, it is possible to obtain the thermoplastic resin composition with improved productivity and the molded article employing the same by solving problems such as the difficulty in the molding process due to low flowability and deterioration of the physical properties following degradation of the resin due to excessive frictional heat, which were the problems of the conventional heat-resistant ABS.

Best Mode for Carrying out Invention

The present invention will be explained in more detail via examples below. It would be apparent to a person of ordinary skill in the art that these examples are only intended to describe the present invention more specifically, and the scope of the present invention according to the subject of the present invention is not limited by these examples.

The present invention relates to a styrene-based thermoplastic resin composition with improved flowability, more specifically, to a thermoplastic resin composition having improved flowability, while maintaining heat resistance, by introducing a low-molecular weight styrene-acrylonitrile (SAN) resin to an acrylonitrile-butadiene-styrene (ABS) resin to which a heat-resistant resin is added to reinforce the heat resistance, and a molded article by molding the same.

By "an acrylonitrile-butadiene-styrene resin with reinforced heat resistance" and "a heat-resistant acrylonitrile-butadiene-styrene resin" in the description of the present invention, it means the acrylonitrile-butadiene-styrene graft copolymer part of which is substituted with a heat-resistant monomer, or the entire resin obtained by adding a heat-resistant copolymer or a heat-resistant resin to the acrylonitrile-butadiene-styrene graft copolymer.

Hereinafter, the thermoplastic resin composition of the present invention is explained in detail.

Thermoplastic Resin Composition

1. Acrylonitrile-butadiene-styrene Graft Copolymer

The acrylonitrile-butadiene-styrene graft copolymer (or ABS graft copolymer) of the present invention is a copolymer wherein an aromatic vinyl compound and a vinyl cyanide compound are grafted to a rubbery polymer.

The rubbery copolymer is not restricted in its configuration, but may employ at least one selected from the group consisting of diene-based rubbers such as polybutadiene, polystyrene-butadiene and polyacrylonitrile-butadiene, saturated rubbers that hydrogen is added to the diene-based rubbers, acrylic rubbers such as C1-C8 alkyl acrylate, polybutyl acrylate and ethylhexyl acrylate, isoprene rubbers, chloroprene rubbers, ethylene-propylene (EPM) rubbers and ethylene-propylene-diene monomers (EPDM) rubbers, and preferably polybutadiene rubber among the diene-based rubbers.

The content of the rubbery polymer is not limited in the present invention, but is preferably 30 to 75% by weight based on the total weight of the graft copolymer resin. When using the above rubbery polymer, the graft copolymer has not only high graft ratio, but also the molded article being finally prepared has excellent impact strength and chemical resistance.

The aromatic vinyl compound which is grafted to the rubbery polymer is not restricted in its kinds, but may employ at least one selected from the group consisting of styrene, α-methylstyrene, β-methylstyrene, p-methylstyrene, ethylstyrene, hydroxystyrene, vinyl xylene, monochlorostyrene, dichlorostyrene, dibromostyrene and vinylnaphthalene, and preferably styrene.

The content of the aromatic vinyl compound is not limited in the present invention, but is suitably 20 to 65% by weight based on the total weight of the graft copolymer resin, and in the above range it is possible to efficiently raise the graft ratio with the rubbery polymer.

The vinyl cyanide compound being grafted to the rubbery polymer is not restricted in its configuration, but may employ at least one selected from saturated nitriles such as acrylonitrile and unsaturated nitriles such as methacrylonitrile and ethacrylonitrile, and preferably acrylonitrile.

The content of the vinyl cyanide compound is not limited in the present invention, but is suitably 5 to 30% by weight based on the total weight of the graft copolymer resin, and in the above range it is possible to efficiently raise the graft ratio with the rubbery polymer.

Most preferably, the acrylonitrile-butadiene-styrene copolymer (hereinafter, referred to as "ABS" graft copolymer) wherein acrylonitrile and styrene are grafted to a butadiene rubbery polymer can be used, which represents physical properties such as impact resistance and heat resistance outstandingly. The ABS resin used in one embodiment of the present invention is one that styrene-acrylonitrile (SAN) is grafted to a butadiene rubber as in Formula 1 below. In this specification the "ABS resin" is not necessarily designated to only acrylonitrile-butadiene-styrene copolymer (ABS) resin, and in certain situations it is evident that it can be broadly interpreted to include a resin composed of a copolymer of a vinyl cyanide compound-rubbery polymer-aromatic vinyl compound.

[Formula 1]

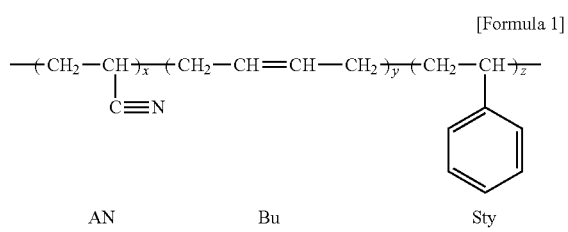

2. Heat-resistant Reinforced Matrix (AMS-based/PMI-based Heat-resistant Resin)

General methods for providing the ABS resin with heat resistance include a method of adding α-methylstyrene-based or maleimide-based monomers having excellent heat resistance in the ABS polymerization process, and a method of mixing heat-resistant copolymers including the above monomers having excellent heat resistance with the ABS resin. The copolymer having excellent heat resistance is usually prepared by copolymerizing or ternary copolymerizing the α-methylstyrene-based or maleimide-based monomer with a vinyl cyanide compound such as acrylonitrile and/or an aromatic vinyl compound monomer such as styrene.

A method of preparing the heat-resistant ABS resin by kneading the heat-resistant copolymer to the graft ABS resin has been proposed. As preparing methods for the heat-resistant ABS resin, a method of preparing the heat-resistant ABS resin by replacing some or all of styrene used on preparing the heat-resistant copolymer for kneading with α-methylstyrene having excellent heat resistance (U.S. Pat. Nos. 3,010,936 and 4,659,790), a method of preparing the heat-resistant ABS resin by including a maleimide compound (JP Laid-open Patent Publication Nos. SO58-206657, SO63-162708 and SO63-235350, and U.S. Pat. No. 4,757,109), a method of kneading with a polycarbonate resin and a method of filling inorganic materials, etc., are known.

The heat-resistant copolymer of the present invention is one prepared by copolymerizing an aromatic vinyl compound with a polymeric monomer having a heat-resistant property in a certain temperature range, or one prepared by copolymerizing a vinyl cyanide compound hereto additionally. For example, the above heat-resistant polymeric monomer may be at least one selected from the group consisting of α-methylstyrene, N-phenylmaleimide, N-phenylmaleic acid and styrene maleic anhydride. The heat-resistant resin in the present invention includes a copolymer comprising α-methylstyrene basically, and also a copolymer comprising N-phenylmaleimide additionally.

(i) α-methylstyrene (hereinafter referred to as "AMS")-based polymer

As a heat-resistant copolymer of the present invention, AMS-based polymer is a copolymer of AMS and acrylonitrile (AN) or a copolymer of AMS, acrylonitrile (AN) and styrene as in Formula 2 below.

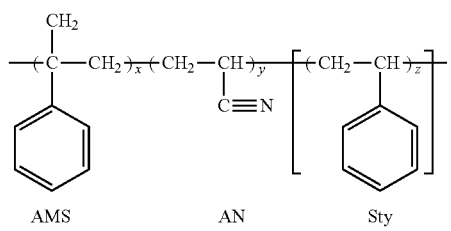

[Formula 2]

As the copolymer of Formula 2, the polymer prepared by copolymerizing 50 to 80 parts by weight of the AMS monomer and 20 to 50 parts by weight of acrylonitrile (AN) and 0 to 10 parts by weight of styrene in a predetermined ratio is used.

If the content of the AMS monomer is less than 50 parts by weight, there may be a problem wherein the heat resistance is lowered and the color is changed to yellow on heating. However, if it is more than 80 parts by weight, there may be a problem wherein the resulting heat-resistant resin may be easily degraded with heat due to a rapidly generated structure in the chain that three or more of AMS are combined in series ([AMS]-[AMS]-[AMS]: thermal decomposition structure).

Also, if the content of acrylonitrile (AN) is less than 20 parts by weight, there may be a problem wherein the conversion rate and the molecular weight are lowered. If it is more than 50 parts by weight, there may be a problem wherein an insoluble gel polymer in a solvent is created due to a large amount of acrylonitrile within the resin. Since the thermal stability of the gel polymer is very low and the gel polymer may act as a red or black foreign body on heating, and thus the appearance of the product is damaged.

Furthermore, if the content of styrene is more than 10 parts by weight, there may be a problem wherein the heat resistance is lowered.

In the present invention, it is preferred to comprise 15 to 40% by weight of an ABS graft copolymer, 20 to 85% by weight of an AMS-based heat-resistant resin and 0 to 65% by weight of a general SAN resin. If the content of the above AMS-based polymer is less than 20% by weight, sufficient heat resistance cannot be obtained, whereas if it is more than 85% by weight, there is a problem wherein impact strength is lowered due to the relative lack of the graft ABS polymer.

(ii) N-phenylmaleimide (hereinafter referred to as "PMI")-based polymer

The PMI-based polymer as the heat-resistant resin of the present invention may be a copolymer of N-(substituted) maleimide, a vinyl monomer and an unsaturated dicarboxylic acid.

The PMI-based polymer is represented by a ternary copolymer of N-phenylmaleimide-styrene-maleic anhydride (PMI-styrene-maleic anhydride) as in Formula 3 below.

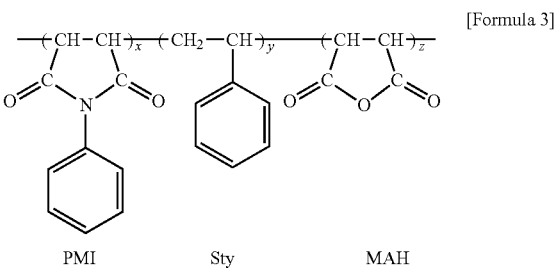

[Formula 3]

The above ternary copolymer of Formula 3 is composed of, preferably 45 to 55% by weight of PMI, 40 to 50% by weight of styrene and 1 to 10% by weight of maleic anhydride, and most preferably 50% by weight of PMI, 45% by weight of styrene and 5% by weight of maleic anhydride, but is not limited to this in the present invention.

The PMI-based polymer of the present invention may be used with the ABS resin alone or in a mixture with the AMS-based polymer. It is preferred to be composed of 15 to 40% by weight of the ABS graft copolymer, 5 to 40% by weight of the PMI-based heat-resistant resin and 20 to 80% by weight of a general SAN resin or 15 to 40% by weight of the ABS graft copolymer, 20 to 80% by weight of the AMS-based heat-resistant resin, 5 to 40% by weight of the PMI-based heat-resistant resin and 0 to 60% by weight of the general SAN resin. In the above range, the excellent heat resistance and impact resistance are advantageous.

3. General Matrix (SAN Resin)

The present invention uses the heat-resistant ABS resin in which the general SAN resin having a weight average molecular weight (Mw) of 100,000 to 180,000 is further comprised and employed as a matrix.

The SAN resin is a copolymer of an aromatic vinyl compound and a vinyl cyanide compound, for which detail explanation would be omitted, since they were stated in "Graft Copolymer" above.

Specifically, the SAN resin employs styrene-acrylonitrile (hereinafter referred to as "SAN") obtained by copolymerizing styrene as an aromatic vinyl compound and acrylonitrile as a vinyl cyanide compound as in Formula 4 below.

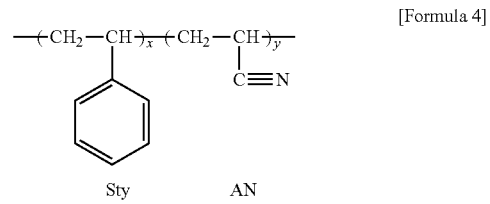

[Formula 4]

In this specification, the "SAN resin" is not necessarily designated to only a styrene-acrylonitrile (SAN) copolymer resin, and in certain situations it is evident that it can be broadly interpreted to include a resin composed of a copolymer of a vinyl cyanide compound-aromatic vinyl compound.

4. Flowability Reinforced Matrix (Low Molecular Weight SAN Resin)

Flowability reinforced matrix of the present invention is a copolymer of an aromatic vinyl compound and a vinyl cyanide compound, with a low molecular weight.

Generally, the SAN copolymer having a weight average molecular weight (Mw) of 100,000 to 250,000 is used as a matrix of ABS copolymer as stated above. The thermoplastic resin prepared by applying the AMS-based and/or PMI-based heat-resistant resin as a matrix for imparting heat resistance to the ABS resin has excellent mechanical strength and heat resistance, but may have reduced flowability, and thus there is a problem of productivity. Hence, the present invention employs the SAN resin with a weight average molecular weight (Mw) of 10,000 to 70,000 in a predetermined amount to complement the reduced flowability of the heat-resistant ABS resin.

Preferably, the low molecular weight SAN resin is included in 0.5 to 10 parts by weight relative to 100 parts by weight of the heat-resistant acrylonitrile-butadien-styrene (ABS) resin. If the content is less than the above range, an effect of complementing the flowability cannot be ensured, whereas, conversely, if the content is more than the above range, there is a possibility that the heat resistance and the impact strength are lowered.

Hereinafter, the possible processes for producing the thermoplastic resin of the present invention are explained.

Process for Preparation

As the process for preparing the copolymer resin, emulsion polymerization, suspension polymerization, solution polymerization, bulk polymerization, a method using suspension polymerization and bulk polymerization together, and a method using emulsion polymerization and bulk polymerization together, and the like have been known.

Among the above methods, the emulsion polymerization and the suspension polymerization have an advantage in that the deformation of a polymer by heat is small, since the reaction heat can be emitted relatively easily and thereby the reaction temperature is easily controlled, as is well known. Meanwhile, emulsifiers, thickeners or flocculants, and the like must be used in the polymerization procedures, and these added materials are not completely removed in the final step and remain as impurities in the final product to degrade each physical property. In addition, there is a problem of going through additional procedures such as dewatering, coagulating or drying for removing water, a reaction medium, after completing the polymerization. Besides, since the removed water should again go through a wastewater treatment procedure, they have a disadvantage of costly processes compared to the bulk polymerization being continuous processes.

On the other hand, in the solution polymerization or the bulk polymerization it is difficult to control the reaction heat or viscosity of the reaction solution, but no separate additives are needed for polymerization. Accordingly, the final product contains very few remaining impurities and thus has excellent physical properties. Furthermore, since all the solvents used as a reaction medium and the un-reacted monomers are recovered after polymerization and can be used again, there is an advantage in that the production cost is very low unlike emulsion polymerization or suspension polymerization.

The present invention is not limited to any one among the above preparation methods, but emulsion polymerization or bulk polymerization is commonly used in the production site. The ABS base resin used in the examples of the present invention was prepared by emulsion polymerization, the AMS-based heat-resistant resin and the PMI-based heat-resistant resins were prepared by bulk polymerization, and the low molecular weight SAN resin was prepared by suspension polymerization.

Hereinafter, the present invention is explained in detail via examples.

EXAMPLES

1. Composition Preparation and Production

A. ABS Graft Copolymer

The product named DP270 (manufactured by LG CHEM, LTD.), prepared by emulsion polymerization, was used. The content of butadiene in the resin was 60%, and the volume average rubber particle size was 0.3 µm.

B. Heat-resistant Reinforced SAN Matrix

B-1. AMS-based Heat-Resistant Copolymer

The product named 100UH (manufactured by LG CHEM, LTD.), prepared from alpha-methylstyrene (AMS) and acrylonitrile by a bulk polymerization, was used.

B-2. PMI-based Heat-resistant Copolymer

The product named MS-NB (manufactured by Denka), comprised of N-phenylmaleimide (PMI), styrene and maleic anhydride, was used.

C. General SAN

The product named 92HR (manufactured by LG CHEM, LTD.), prepared by bulk polymerization, was used. The content of acrylonitrile in the resin was 27%, and the weight average molecular weight (Mw) was 130,000.

D. Flowability Reinforced SAN Resin

D-1. Low Molecular weight SAN Copolymer

The product named EMI-100 (manufactured by SUNNY FC), prepared by suspension polymerization, was used, in which the weight average molecular weight (Mw) was 45,000.

D-2. Low Molecular Weight SAN Copolymer

The product named EMI-200 (manufactured by SUNNY FC), prepared by suspension polymerization, in which the weight average molecular weight (Mw) was 60,000, was used.

In Examples 1 to 7 and Comparative Examples 1 to 4 below, compositions were prepared by adding the low molecular weight SAN resins (D-1, D-2) according to the component ratios as shown in the below Table 1 to 100 parts by weight of the heat-resistant ABS resin comprising the ABS graft copolymer (A), and the AMS-based heat-resistant resin (B-1) and the PMI heat-resistant resin (B-2) alone or together, and optionally the general SAN resin (C). In Table 1, A, B-1, B-2, C, D-1 and D-2 are the thermoplastic resins prepared above.

TABLE 1

| (Parts by Weight) | Ex. 1 | Ex. 2 | Ex. 3 | Ex. 4 | Ex. 5 | Ex. 6 | Ex. 7 | Com. Ex. 1 | Com. Ex. 2 | Com. Ex. 3 | Com. Ex. 4 |
|---|---|---|---|---|---|---|---|---|---|---|---|
| A | 25 | 25 | 25 | 25 | 25 | 30 | 30 | 25 | 25 | 30 | 30 |
| B-1 | 60 | 75 | 75 | 75 | 75 | 50 | 0 | 60 | 75 | 50 | 0 |
| B-2 | 0 | 0 | 0 | 0 | 0 | 20 | 35 | 0 | 0 | 20 | 35 |
| C | 15 | 0 | 0 | 0 | 0 | 0 | 35 | 15 | 0 | 0 | 35 |
| D-1 | 0 | 3 | 7 | 0 | 0 | 0 | 0 | 0 | 0 | 0 | 0 |
| D-2 | 3 | 0 | 0 | 3 | 7 | 3 | 3 | 0 | 0 | 0 | 0 |

(Ex.: Example; Com. Ex.: Comparative Example)

Example 1

The copolymers, resins, etc., as prepared above were used. The composition was prepared by adding 3 parts by weight of (D-2) low molecular weight SAN resin (EMI-200, manufacturer: Sunny FC) to 100 parts by weight of the heat-resistant ABS resin comprising 25 parts by weight of (A) ABS graft copolymer (DP270, manufacturer: LG CHEM, LTD.), 60 parts by weight of (B-1) AMS heat-resistant resin (100UH, manufacturer: LG CHEM, LTD.) and 15 parts by weight of (C) general SAN resin (92HR, manufacturer: LG CHEM, LTD.).

Example 2

The copolymers, resins, etc., as prepared above were used. The composition was prepared by adding 3 parts by weight of (D-1) low molecular weight SAN resin (EMI-100, manufacturer: Sunny FC) to 100 parts by weight of the heat-resistant ABS resin comprising 25 parts by weight of (A) ABS graft copolymer (DP270, manufacturer: LG CHEM, LTD.), and 75 parts by weight of (B-1) AMS heat-resistant resin (100UH, manufacturer: LG CHEM, LTD.).

Example 3

The copolymers, resins, etc., as prepared above were used. The composition was prepared by adding 7 parts by weight of (D-1) low molecular weight SAN resin (EMI-100, manufacturer: Sunny FC) to 100 parts by weight of the heat-resistant ABS resin comprising 25 parts by weight of (A) ABS graft copolymer (DP270, manufacturer: LG CHEM, LTD.), 75 parts by weight of (B-1) AMS heat-resistant resin (100UH, manufacturer: LG CHEM, LTD.).

Example 4

The copolymers, resins, etc., as prepared above were used. The composition was prepared by adding 3 parts by weight of (D-2) low molecular weight SAN resin (EMI-200, manufacturer: Sunny FC) to 100 parts by weight of the heat-resistant ABS resin comprising 25 parts by weight of (A) ABS graft copolymer (DP270, manufacturer: LG CHEM, LTD.), 75 parts by weight of (B-1) AMS heat-resistant resin (100UH, manufacturer: LG CHEM, LTD.).

Example 5

The copolymers, resins, etc., as prepared above were used. The composition was prepared by adding 7 parts by weight of (D-2) low molecular weight SAN resin (EMI-200, manufacturer: Sunny FC) to 100 parts by weight of the heat-resistant ABS resin comprising 25 parts by weight of (A) ABS graft copolymer (DP270, manufacturer: LG CHEM, LTD.), 75 parts by weight of (B-1) AMS heat-resistant resin (100UH, manufacturer: LG CHEM, LTD.).

Example 6

The copolymers, resins, etc., as prepared above were used. The composition was prepared by adding 3 parts by weight of (D-2) low molecular weight SAN resin (EMI-200, manufacturer: Sunny FC) to 100 parts by weight of the heat-resistant ABS resin comprising 30 parts by weight of (A) ABS graft copolymer (DP270, manufacturer: LG CHEM, LTD.), 50 parts by weight of (B-1) AMS heat-resistant resin (100UH, manufacturer: LG CHEM, LTD.) and 20 parts by weight of (B-2) PMI heat-resistant resin (MS-NB, manufacturer: Denka).

Example 7

The copolymers, resins, etc., as prepared above were used. The composition was prepared by adding 3 parts by weight of (D-2) low molecular weight SAN resin (EMI-200, manufacturer: Sunny FC) to 100 parts by weight of the heat-resistant ABS resin comprising 30 parts by weight of (A) ABS graft copolymer (DP270, manufacturer: LG CHEM, LTD.), 35 parts by weight of (B-2) PMI heat-resistant resin (MS-NB, manufacturer: Denka) and 35 parts by weight of (C) general SAN resin (92HR, manufacturer: LG CHEM, LTD.).

Comparative Example 1

The copolymers, resins, etc., as prepared above were used. The composition was prepared from 25 parts by weight of (A) ABS graft copolymer (DP270, manufacturer: LG CHEM, LTD.), 60 parts by weight of (B-1) AMS heat-resistant resin (100UH, manufacturer: LG CHEM, LTD.) and 15 parts by weight of (C) general SAN resin (92HR, manufacturer: LG CHEM, LTD.).

Comparative Example 2

The copolymers, resins, etc., as prepared above were used. The composition was prepared from 25 parts by weight of (A) ABS graft copolymer (DP270, manufacturer: LG CHEM, LTD.) and 75 parts by weight of (B-1) AMS heat-resistant resin (100UH, manufacturer: LG CHEM, LTD.).

Comparative Example 3

The copolymers, resins, etc., as prepared above were used. The composition was prepared from 30 parts by weight of (A) ABS graft copolymer (DP270, manufacturer: LG CHEM, LTD.), 50 parts by weight of (B-1) AMS heat-resistant resin (100UH, manufacturer: LG CHEM, LTD.) and 20 parts by weight of (B-2) PMI heat-resistant resin (MS-NB, manufacturer: Denka).

Comparative Example 4

The copolymers, resins, etc., as prepared above were used. The composition was prepared from 30 parts by weight of (A) ABS graft copolymer (DP270, manufacturer: LG CHEM, LTD.), 35 parts by weight of (B-2) PMI heat-resistant resin (MS-NB, manufacturer: Denka) and 35 parts by weight of (C) general SAN resin (92HR, manufacturer: LG CHEM, LTD.).

2. Measurement of Physical Properties

Table 2 below shows the results of measuring physical properties of flow index (g/10 min), impact strength (kgf·cm/cm) and heat deflection temperature (HDT, ° C.) about specimens for measuring manufactured by kneading the above compositions of Examples 1 to 7 and Comparative Examples 1 to 4 in a twin-screw extruder at 240, followed by injection.

The evaluation conditions of physical properties in the present invention are as follows.

(1) Flowability: it was measured under the condition of 220° C., 10 kgf/cm² according to ASTM D1238.

(2) Impact strength: it was measured on a specimen having a thickness of 3.2 mm and the formed notch using an IZOD impact strength tester (manufacturer: TINIUS OLSEN) according to ASTM D256.

(3) Heat deflection temperature (HDT): it was measured for a specimen having a thickness of 6.35 mm under a load of 18.6 kgf/cm² and a temperature elevation rate of 120/hr according to ASTM D648.

TABLE 2

|  | Ex. 1 | Ex. 2 | Ex. 3 | Ex. 4 | Ex. 5 | Ex. 6 | Ex. 7 | Com. Ex. 1 | Com. Ex. 2 | Com. Ex. 3 | Com. Ex. 4 |
|---|---|---|---|---|---|---|---|---|---|---|---|
| Impact Strength (kgf · cm/cm) | 18.1 | 17.5 | 17.0 | 17.4 | 16.8 | 17.4 | 12.8 | 18.5 | 17.9 | 18.1 | 13.3 |
| Flowability (g/10 min) | 10.8 | 8.5 | 9.6 | 8.4 | 9.5 | 4.4 | 4.1 | 9.0 | 7.0 | 3.5 | 3.0 |
| HDT (° C.) | 98 | 102 | 101 | 102 | 101 | 107 | 112 | 98 | 102 | 107 | 112 |

(Ex.: Example; Com. Ex.: Comparative Example)

As shown in Table 1 and Table 2, the flowability of Examples 1 to 7 to which (D) flowability reinforced low molecular weight SAN resin was added increased by 20 to 40% compared to that of Comparative Examples 1 to 4 without addition.

Meanwhile, it can be seen that upon comparing Examples 1 to 7 with Comparative Examples 1 to 4, the heat deflection temperature (HDT) to evaluate heat resistance has not changed significantly.

In addition, the values of impact strength in Examples 1 to 7 showed a tendency to be slightly lower than those of Comparative Examples 1 to 4, but it appeared that the degree was too little to be the level affecting macroscopic physical properties.

Upon comparing Examples 2 and 3 from the above results of evaluating physical properties, the flowability was increased from 8.5 g/10min to 9.6 g/10min in a relatively high width, as a result of increasing the amount of (C) flowability reinforced SAN from 3 parts by weight to 7 parts by weight. Meanwhile, the HDT to evaluate the heat resistance was decreased from 102° C. to 101° C., in which the width of decrease appeared to be a negligible level. The same result is seen from a comparison of Examples 4 and 5. Therefore, introduction of the low molecular weight SAN resin of the present invention improves the flowability, while maintaining the heat resistance in the same level.

In general, in case of the SAN resin with the weight average molecular weight (Mw) of 100,000 or less, there was a problem that the low molecular materials were largely included inside the resin to lower the heat resistance, and thus the SAN resin of 100,000 or less is not usually used in the heat-resistant ABS resin. However, in the present invention, the thermoplastic resin composition wherein the SAN resin having a weight average molecular weight (Mw) in the range of 10,000 to 70,000 was added as a flowability reinforced matrix in a predetermined composition ratio to the heat-resistant ABS resin employing the AMS and/or PMI resins as the heat resistance reinforced matrix showed improved flowability while maintaining heat resistance within an acceptable range. The impact strength was expected to be lower due to the low molecular weight resin, but the experimental results confirmed that the impact strength was not reduced to a serious level.

The thermoplastic resin composition of the present invention wherein the SAN resin having the weight average molecular weight (Mw) of 10,000 to 70,000 was added in the range of 0.5 to 10 parts by weight relative to the total weight of the entire heat-resistant ABS resin has improved flowability without lowering the heat resistance and the impact strength, and thus improvement of the processability and the productivity in manufacturing a molded article is expected.

The invention claimed is:

1. A thermoplastic resin composition with improved flowability comprising:
   100 parts by weight of a heat-resistant acrylonitrile-butadiene-styrene (ABS) resin; and
   0.5 to 10 parts by weight of a styrene-acrylonitrile (SAN) resin having a weight average molecular weight (Mw) of 10,000 to 70,000 g/mol.

2. The thermoplastic resin composition with improved flowability according to claim 1, characterized in that said heat-resistant acrylonitrile-butadiene-styrene resin comprises a copolymer wherein acrylonitrile and styrene are grafted to a butadiene rubbery polymer, and at least one selected from the group consisting of α-methylstyrene (AMS)-based heat-resistant resin, N-phenylmaleimide (PMI)-based heat-resistant resin and a combination thereof.

3. The thermoplastic resin composition with improved flowability according to claim 1, characterized in that said heat-resistant acrylonitrile-butadiene-styrene resin further comprises a styrene-acrylonitrile resin having a weight average molecular weight of 100,000 to 180,000 g/mol.

4. The thermoplastic resin composition with improved flowability according to claim 2, characterized in that said heat-resistant acrylonitrile-butadiene-styrene resin comprises:
   a) 15 to 40% by weight of an acrylonitrile-butadiene-styrene graft copolymer;
   b-1) 20 to 85% by weight of an α-methylstyrene-based heat-resistant resin; and
   c) 0 to 65% by weight of a styrene-acrylonitrile resin having a weight average molecular weight of 100,000 to 180,000 g/mol.

5. The thermoplastic resin composition with improved flowability according to claim 2, characterized in that said heat-resistant acrylonitrile-butadiene-styrene resin comprises:
   a) 15 to 40% by weight of an acrylonitrile-butadiene-styrene graft copolymer;
   b-2) 5 to 40% by weight of an N-phenylmaleimide-based heat-resistant resin; and
   c) 20 to 80% by weight of a styrene-acrylonitrile resin with a weight average molecular weight (Mw) of 100,000 to 180,000 g/mol.

6. The thermoplastic resin composition with improved flowability according to claim 2, characterized in that said heat-resistant acrylonitrile-butadiene-styrene resin comprises:
   a) 15 to 40% by weight of an acrylonitrile-butadiene-styrene graft copolymer;
   b-1) 20 to 80% by weight of an α-methylstyrene-based heat-resistant resin;
   b-2) 5 to 40% by weight of an N-phenylmaleimide-based heat-resistant resin; and
   c) 0 to 60% by weight of a styrene-acrylonitrile resin having a weight average molecular weight of 100,000 to 180,000 g/mol.

7. A molded article molding the thermoplastic resin composition of claim 1.

8. The thermoplastic resin composition with improved flowability according to claim 3, characterized in that said heat-resistant acrylonitrile-butadiene-styrene resin comprises:
   a) 15 to 40% by weight of an acrylonitrile-butadiene-styrene graft copolymer;

b-1) 20 to 85% by weight of an α-methylstyrene-based heat-resistant resin; and c) 0 to 65% by weight of a styrene-acrylonitrile resin having a weight average molecular weight of 100,000 to 180,000 g/mol.

9. The thermoplastic resin composition with improved flowability according to claim 3, characterized in that said heat-resistant acrylonitrile-butadiene-styrene resin comprises:

a) 15 to 40% by weight of an acrylonitrile-butadiene-styrene graft copolymer;

b-2) 5 to 40% by weight of an N-phenylmaleimide-based heat-resistant resin; and c) 20 to 80% by weight of a styrene-acrylonitrile resin with a weight average molecular weight (Mw) of 100,000 to 180,000 g/mol.

10. The thermoplastic resin composition with improved flowability according to claim 3, characterized in that said heat-resistant acrylonitrile-butadiene-styrene resin comprises:

a) 15 to 40% by weight of an acrylonitrile-butadiene-styrene graft copolymer;

b-1) 20 to 80% by weight of an α-methylstyrene-based heat-resistant resin;

b-2) 5 to 40% by weight of an N-phenylmaleimide-based heat-resistant resin; and c) 0 to 60% by weight of a styrene-acrylonitrile resin having a weight average molecular weight of 100,000 to 180,000 g/mol.

* * * * *